United States Patent
Pichler (10) Patent No.: US 7,814,654 B2
(45) Date of Patent: Oct. 19, 2010

(54) METHOD FOR REMOVING A CABLE CORE FROM A CABLE SHEATH

(76) Inventor: Alois Pichler, Schwarzenberg 5, Ybbsitz (AT) A-3341

( * ) Notice: Subject to any disclaimer, the term of this patent is extended or adjusted under 35 U.S.C. 154(b) by 1293 days.

(21) Appl. No.: 10/467,979

(22) PCT Filed: Feb. 20, 2002

(86) PCT No.: PCT/AT02/00056

§ 371 (c)(1), (2), (4) Date: Jan. 26, 2004

(87) PCT Pub. No.: WO02/067397

PCT Pub. Date: Aug. 29, 2002

(65) Prior Publication Data

US 2004/0117964 A1    Jun. 24, 2004

(30) Foreign Application Priority Data

Feb. 20, 2001 (WO) .................. PCT/AT01/00041
Jun. 28, 2001 (AT) .................. A 1010/2001

(51) Int. Cl.
| | |
|---|---|
| H01R 43/00 | (2006.01) |
| B21C 1/00 | (2006.01) |
| B63B 35/03 | (2006.01) |
| B63B 35/04 | (2006.01) |
| F16L 1/00 | (2006.01) |
| H02G 1/12 | (2006.01) |

(52) U.S. Cl. .................. 29/870; 29/33 F; 405/154.1; 81/9.51

(58) Field of Classification Search .......... 29/854, 29/868–70, 33 F, 745, 426.6, 234, 748; 405/154.1; 81/9.51

See application file for complete search history.

(56) References Cited

U.S. PATENT DOCUMENTS 2,658,939 A * 11/1953 Greenfield et al. .......... 174/24

(Continued)

FOREIGN PATENT DOCUMENTS

DE    3213129    10/1983

(Continued)

OTHER PUBLICATIONS

Sakai, Yasunobu. Japanese Office Action "Notice of Reasons for Rejection" Apr. 3, 2007, pp. 1-13.

(Continued)

*Primary Examiner*—Derris H Banks
*Assistant Examiner*—David P Angwin
(74) *Attorney, Agent, or Firm*—Stroock & Stroock & Lavan LLP (57) ABSTRACT

The invention relates to a method for removing a cable core from a cable sheath, which cable core comprises an envelope (8), wherein, at an end of the cable (1), a flowable medium (22) is introduced under pressure into the cable tube (9) so as to reduce friction, and a tensile force (F) is exerted on the cable core at an end (5) of the cable (1). To provide a method by which existing cables can be freed from their core in as quick and inexpensive a manner as possible, it is provided for the flowable medium to be introduced precisely targeted into the annular space between the inner side of the cable sheath and the envelope (8) of the cable core.

34 Claims, 6 Drawing Sheets

U.S. PATENT DOCUMENTS

| | | | |
|---|---|---|---|
| 3,602,482 A * | 8/1971 | Guinot | 254/361 |
| 4,018,058 A | 4/1977 | Eichenseher | |
| 4,048,807 A | 9/1977 | Ellers | |
| 4,197,628 A * | 4/1980 | Conti et al. | 29/426.5 |
| 4,232,981 A | 11/1980 | Lee | |
| 4,281,444 A | 8/1981 | Smith | |
| 4,378,299 A * | 3/1983 | Alexander | 508/219 |
| 4,553,877 A | 11/1985 | Edvardsen | |
| 4,564,454 A * | 1/1986 | Briner et al. | 210/668 |
| 5,190,679 A | 3/1993 | McDonald | |
| 5,580,186 A * | 12/1996 | Tassone et al. | 405/154.1 |
| 5,884,384 A * | 3/1999 | Griffioen | 29/468 |
| 5,997,215 A * | 12/1999 | Schwert | 405/184 |
| 6,068,426 A * | 5/2000 | Blanquet et al. | 405/184 |
| 6,089,546 A | 7/2000 | Griffioen et al. | |
| 6,204,225 B1 | 3/2001 | Lightcap | |
| 6,540,208 B1 | 4/2003 | Pecot et al. | |
| 6,976,498 B2 * | 12/2005 | Leppert et al. | 137/15.13 |
| 2003/0220205 A1 | 11/2003 | Manka | |

FOREIGN PATENT DOCUMENTS

| | | | |
|---|---|---|---|
| DE | 3900152 | * | 4/1990 |
| DE | 40 38 156 | A1 | 6/1992 |
| DE | 4312332 | | 10/1994 |
| EP | 0 821 255 | A1 | 1/1998 |
| EP | 964106 | | 12/1999 |
| EP | 990932 | | 4/2000 |
| FR | 2 774 521 | | 8/1999 |
| JP | 59 104607 | | 6/1984 |
| JP | 2-210304 | | 8/1990 |
| JP | 2-265109 | | 10/1990 |
| JP | 7154910 | | 6/1995 |
| JP | 8-171819 | | 7/1996 |
| RU | 2057388 | | 3/1996 |
| RU | 2125330 | | 1/1999 |
| WO | WO 82/00388 | A | 2/1982 |

OTHER PUBLICATIONS

Office action by Austrian patent office in examination of A1010/2001 dated 2002.

Office action by Austrian patent office in examination of AT1113/2007 dated Feb. 5, 2008.

Office Action dated Nov. 10, 2009 issued in counterpart Polish Pat. App. No. P-363266 with English language translation.

* cited by examiner

METHOD FOR REMOVING A CABLE CORE FROM A CABLE SHEATH

The invention relates to a method for removing a cable core from a cable sheath of a cable, which cable core comprises an envelope, wherein at one end of the cable—the so-called proximal cable end—a flowable medium is introduced under pressure into the cable tube so as to reduce friction, and a tensile force is applied to the cable core at an end of the cable.

The present invention particularly relates to underground cables for telecommunication purposes, which usually comprise a cable core with a plurality of leads and at least on envelope surrounding them altogether and provided e.g. by a paper winding. Moreover, such cables mostly have a rigid cable sheath which may often be formed by a layer of lead (Pb) over which a steel layer and, in addition, a fabric or synthetic material envelope may be arranged. Yet, the invention also relates to aerially supported cables, e.g. telecommunication cables guided on high voltage towers.

The term flowable medium includes gaseous, liquid or pasty media or mixed forms thereof.

The rapid technical development in the field of telecommunications requires the use of new data transmission lines via which higher data rates can be transmitted. In this connection, particularly optical waveguides with low attenuation are used, via which a very high bandwidth can be transmitted with little loss. At present, in particular following the liberalisation of telecommunication, there exist efforts to replace the old cable networks by new networks of higher capacity.

The laying of new cables in the ground by means of costly earthwork is also very expensive and time-consuming. With the prevailing competition in the field of telecommunications, this is not tolerable.

One method of renewing old cables consists in that tubes are fastened to the cables laid in the ground or the like, which tubes are pulled in when the existing cables are pulled out and thus take their place. Subsequently, optical waveguides, e.g., are laid in the tubes. What is disadvantageous is that the surrounding soil poses an enormous resistance to the cable or tube, respectively, to be inserted, so that always only short distances can be renewed without earthwork.

One method of removing inner conductors from cables is known e.g. from WO 82/00388 A1. In this known method, a fluid is introduced under pressure in the cable in coaxial mode of construction so as to break and remove the insulating material between the inner conductor and the shield. Subsequently, the inner conductor can easily be pulled out of the cable. In telecommunication cables comprising a plurality of inner conductors, the insulation is disintegrated by using appropriate substances, whereby the extraction of the inner conductors is facilitated. Moreover, also the use of milling cutters or cutting tools is provided for, which disintegrate the inner conductors of the cable and remove them appropriately. This known technique is very costly and time-consuming and not generally useful for telecommunication cables.

A method of the present type is known from U.S. Pat. No. 4,197,628 A, wherein the ends of a piece of cable are exposed and a sleeve is fastened around one end of the cable. The sleeve is tightly sealed by a cap, and a lubricant is introduced under pressure into the cable core via a connecting piece on the cap. At the opposite end of the cable, the emergence of the lubricant is waited for, and subsequently further introduction of lubricant is stopped. After an envelope usually provided externally on the cable core has been soaked with lubricant, the cable core is pulled out. In practice, this method has not prevailed, since here apparently only relatively short cable sections can be pulled out.

Therefore, the present invention has as its object to provide a method of the initially defined type, by which existing cables can be freed from their cable cores as quickly and cost-effectively as possible so as to be able to use the cable sheath then present as a tube for the laying of, e.g., new data transmission cables, such as optic waveguides or the like, and, on the other hand, be able to re-use the raw materials of the cable core, in particular copper. The removal of the cable core shall be possible over as long cable lengths as possible.

The object of the invention is achieved in that the flowable medium is introduced precisely targeted into an annular space between the inner side of the cable sheath and the envelope of the cable core.

Preferably, at least during part of the step of introducing the flowable medium, the annular space or the entire cable is not pressure-sealed at the other cable end (the so-called distal cable end) so that liquid medium under the action of pressure flows substantially in the annular space to the distal cable end. This partial step therefore will also be termed "flow step" in the following.

Preferably, at least during part of the step of introducing the flowable medium, the annular space or the entire cable is pressure-sealed at the distal end so that the liquid medium under the action of pressure compresses the cable core and/or expands the cable sheath. This partial step therefore will also be termed "compression step" in the following, wherein it must be noted that also during the flow step an (i.a. even higher) compression will occur.

Particularly preferably, in the scope of the present method, both mentioned partial steps are carried out, i.e. at first the flow step and subsequently the compression step. Advantageously, the flow step will be terminated and the compression step will be started when the flowable medium emerges at the distal cable end.

The flow step primarily serves to transport the flowable medium through the entire cable. A closer look shows that here the flowable medium mainly moves in longitudinally extending depressions of the cable core, which are derived from the leads structure of the cable core. A wetting of the interface between envelope and inner side of the cable sheath need not necessarily occur over the entire periphery, but only in smaller partial regions of the periphery corresponding to the aforementioned depressions. In the subsequent compression step, however, the higher lubricant pressure which builds up causes a (continuing) compression of the cable core (and, in cables with an elastic sheath, possibly also an expansion of the sheath), whereby the annular space will be widened over the entire periphery and by this, the entire interface over the entire periphery will be wetted by lubricant.

In embodiments of the method in which the envelope of the cable core to be pulled out is designed as a winding, it has proven to be particularly advantageous to use that cable end as the proximal cable end towards which the winding proceeds. In other words, in this instance the flowable medium is to be moved forwards in the annular space in counter-direction to the winding direction. The precisely targeted introduction of the flowable medium into the annular space between the inner side of the cable sheath and the envelope will be assisted by the fact that the flowable medium is introduced against a possibly present winding direction of the envelope of the leads. Often the envelope of the leads of a cable consists of a strip, in particular of paper, which is wound around the leads in overlapping fashion. By introducing the flowable medium in counter-direction to the winding direction of this envelope, a penetration of the flowable medium into the interior of the cable core is effectively prevented. The method is facilitated by the fact that the flowable medium is introduced at the same end of the cable as that end of the cable at which the cable core is pulled out (i.e., at the proximal end). Thereby, most of the installations required for the method need only be provided at one end of the cable. At the opposite end of the cable (i.e. at the distal end), only the core sealing as well as a closure of the cable end are effected. If, however, a wound envelope of the core, e.g. in case of a helically arranged paper envelope, is present, the extraction of the core in the winding direction will be assisted, since the overlapped portions of the wound envelope are not opened in fan-like manner. When pulling out the core in the winding direction of the envelope, tearing open of the envelope will be prevented and the extraction procedure will not be rendered more difficult. Alternatively, however, the flowable medium may also be introduced at the end of the cable other than that end of the cable at which the core is pulled out.

Besides, in such wound cable core envelopes, it has proven particularly advantageous to pull out the cable core at that cable end, towards which the winding proceeds, i.e. to allow the pulling movement to be effected in the winding direction. In other words, it is particularly advantageous to use that cable end as the proximal end, towards which the winding proceeds, and not only to effect the introduction of the flowable medium, but also the extraction of the cable at this proximal end.

In a preferred embodiment, at least during part of the step of introducing the flowable medium, a compressed gas, in particular compressed air, is introduced into the interior of the cable core surrounded by the envelope. In this manner, a force acting from the inside towards the outside onto the envelope is effected, whereby the entry of the flowable medium into the cable core can effectively be prevented. In this manner, a counter-pressure acting on the envelope from within is produced against the flowable medium that is introduced under pressure, improving the sealing of the envelope towards its inner side. Basically, this measure can be effected during the flow step and/or the compression step or parts thereof. Preferably, however, this measure will be taken only during the compression step so as not to impede the spreading of the flowable medium in the longitudinal direction of the cable during the flow step, on the one hand and to assist in a high pressure build-up during the compression step, on the other hand. The pressure of the pressure gas is, i.a., markedly lower than that with which the flowable medium is introduced so as not to excessively impede both, the flow of the latter in the longitudinal direction of the cable and the compression of the cable core.

In the aforementioned embodiments which have an envelope designed as a winding, e.g. a helically arranged paper envelope, it is, moreover, advantageous to allow the compressed gas, preferably the compressed air, to flow in the interior of the cable core in the winding direction of the envelope. This favorably assists in a sealing of the overlapped portions of the winding and prevents tearing up of the over-lapped portions of the envelope by the compressed air, which might result in a more difficult extraction of the cable core from the cable tube.

It is advantageous to admix a liquid medium, in particular an adhesive, to the compressed gas, in particular to the compressed air, which thereby is introduced into the interior of the cable core. Depending on the construction of the cable, the admixture of a liquid medium to the compressed gas, or compressed air, respectively, may lead to a kind of gluing together of the overlapped portions of the envelope, so that penetration of the flowable medium into the cable core will be made even more difficult. To humidify the compressed gas, water, oil or certain adhesives may be used which are admixed to the pressurized gas to a slight degree. Such additions shall not build up a hydraulic pressure, by which the annular space would be reduced, but a mutual gluing together of the overlapping portions of the winding shall be attained. The volume defined by the cable core shall still remain compressable so that a reduction of the volume will remain feasible by the introduced flowable medium and, consequently, an enlargement of the annular space between the envelope and the inner side of the cable sheath can be attained. As the glue, component glues with retarded hardening which should be as low-viscous as possible, can be employed.

The precisely targeted introduction of the flowable medium into the annular space may advantageously be effected in that the interior of the cable core at the proximal cable end is closed pressure-sealed relative to the flowable medium to be introduced under pressure into the annular space, so that flowable medium cannot penetrate into the interior of the cable core at the proximal cable end. The flowable medium can then be pressed in at the end side of the cable; pressing in is, however, also possible through rearwardly offset radial bores in the cable sheath.

If the distal cable end were simply to be closed without avoiding a communication between the open end of the annular space and the open end of the interior of the cable core, flowable medium emerging from the annular space could enter into the interior of the cable core and flow back therein to the proximal end. To prevent this, preferably the interior of the cable core also at the distal cable end is closed pressure-sealed relative to the annular space so that flowable medium emerging from the annular space cannot enter there into the interior of the cable core.

In both instances, the pressure-sealed closure of the interior of the cable core relative to the annular space can advantageously be achieved by sealing attachment of a core seal to the respective end of the cable core. The core sealing is preferably effected by an elastic envelope which is applied over the exposed leads. In doing so, a vulcanisation band may, e.g., be used which causes an automatic gluing after its application and thus an impervious envelope of the leads.

If it shall be possible to introduce compressed air or to vent the interior of the cable core at the respective end, the core sealing preferably is equipped with a venting tube.

By the fact that the cable core, at least at the proximal cable end, is enveloped, flowable medium cannot enter into the interior of the cable core at the front side thereof. In contrast, the flowable medium is introduced precisely targeted into the annular space between the inner side of the cable sheath and the envelope, whereby a force acts from the outside on the cable core, which force will lead to the compression of the cable core, whereby the annular space is enlarged, a complete wetting of the annular space is assisted and the friction during the extraction is reduced. Thereby, greater lengths of old cable can be freed from the cable core present therein in one procedure. The lengths obtainable will depend i.a. on the type and diameter of the cable, the number of leads in the core, the pressure with which the flowable medium is introduced, the flowable medium used as well as the course of the curves of the cable. By removing the core from the cables, the material thereof, mostly copper, can be re-used, or the empty cable tube formed thereby may be used for laying new wires, e.g. In addition, environmental risks posed by the old cable are reduced.

The flowable medium preferably is introduced into the cable tube before the cable core is pulled out.

In addition, the flowable medium may also be introduced into the cable while the cable core is being pulled out.

If the cable core is equipped at both ends of the cable with a core sealing before the flowable medium is introduced, an entry of the flowable medium can also be prevented at the distal cable end.

To check the tightness and the permeability of the cable, compressed air can be introduced into the interior of the cable core before the flowable medium is introduced. To check the tightness, the pressure on the side of introduction of the compressed air is measured while the compressed air is being introduced. From the measured pressure values, a pressure loss which is caused by a leaking site of the cable can be determined. In such an instance, the cable can be cut apart in front of the leaking site, and the procedure for removing the core from the cable can be carried out for the new cable piece.

To check the permeability of the cable, the pressure is measured on the side other than that of the introduction of the compressed air, while the compressed air is being introduced. In this manner, possible squeezed locations of the cable can be found. If, due to a very pronounced squeezing, for once an extraction were no longer possible, the cable can be cut off in front of this squeezed location and then the method for removing the core can be carried out for the new cable piece.

During the introduction of the flowable medium, the distal end preferably is open so that the air displaced by the flowable medium can escape.

While the flowable medium is being introduced, the cable core preferably is tensioned so as to prevent an axial displacement of the latter during the introduction of the flowable medium. This bias may, e.g., be effected via a tube which serves to introduce the compressed air into the cable core, the tube being glued together with the leads of the cable core and a tensile force of a certain extent being exerted on the tube.

Introduction of the flowable medium is preferably interrupted if the latter emerges at the other end of the cable. In this manner, the amount of the flowable medium is limited to the volume required.

According to a further embodiment, it is provided that after the introduction of the flowable medium, the two ends of the cable are closed in an air-tight and pressure-sealed manner, the cable is provided with a venting tube and that furthermore a pressure is exerted on the flowable medium. By this method step, due to the compression already occurring in the flow step, air present in the interior of the cable core is pressed out through the venting tube, whereby the diameter of the cable core is reduced and thus a wetting of the annular space and, thereby, an extraction of the core is substantially facilitated. In the compression step, on the other hand, it is rather advantageous not to permit venting of the cable core and even to introduce compressed air into the latter, since here the amount of the air volume to be displaced is relatively small.

To prevent the cable core from rotating during the extraction procedure and thus, from possibly enlarging its diameter, the cable core preferably is secured against rotation during the extraction procedure. This may be effected e.g. by cantilevering means on a commonly used collar, via which the cable core is pulled out of the cable tube, the cantilevering means preventing a rotation of the core.

Alternatively, during the extraction procedure, the core preferably could also be rotated into a possibly existing helical direction of the leads present in the cable core, since by this the diameter of the core will be reduced and thus an effect blocking the extraction procedure will not occur.

To allow for a further use of the flowable medium following the extraction procedure, it is provided that at that end of the cable at which the cable core is being pulled out, the flowable medium is stripped off and collected. Stripping off is effected in a simple manner, e.g. by an elastic ring which grazes on the envelope and thus strips off the flowable medium, whereupon it flows into a collecting funnel, e.g., and from there onwards into a container.

To be able to re-use a particularly large portion of the flowable medium, it is provided that at the distal end of the cable, during the extraction procedure of the core, the flowable medium is entrained by the cable. This may be effected e.g. by means of a piston-like element connected to the end of the core, which element transports the flowable medium through the cable sheath to the proximal end of the cable, where, as mentioned above, it is collected by a collecting funnel, e.g., and is guided onwards into a container.

To prevent a damage of the cable sheath during the extraction procedure, the cable sheath preferably is secured against rotation at that end at which the cable core is pulled out. This securing against rotation may, e.g. be effected by a collar with cantilevering means present therein.

The procedure for removing the core from the sheath may be assisted in that during the extraction of the core, a pressure force is exerted on the distal end of the core. In this manner, the tensile force can be reduced to a slight extent, thus reducing the risk of the core being torn. Moreover, the length of the cable which can be reached, which can be freed from its core in one procedure, can be increased by assisting the extraction procedure.

The supporting pressure force may be applied via a flowable medium introduced under pressure to the end of the cable other than that from which the core is pulled out. In this instance, however, a relatively large amount of flowable medium is required.

According to a further embodiment, the tensile force is transmitted to the core via a clamp which is fastened to the core. This constitutes a simple method for carrying out the method according to the invention.

Just as well, the tensile force can be applied to the core via a motor-driven shaft around which the core is wound several times. In this instance, a sufficient length of the core is exposed and wound several times about the motor-driven shaft, drum or the like, resulting in a sufficient friction so that the rotating movement of the shaft, drum or the like can be transmitted as a tensile force on the core.

To further facilitate extraction of the core, and to obtain larger lengths of the core to be extracted, according to a further feature of the method, the introduced gas and/or the introduced liquid may contain an admixed lubricant, or the flowable medium itself may be formed by a lubricant. The lubricant may be provided in liquid or solid form. When using a gas introduced into the cable under pressure, the introduction of a powderized lubricant has proven suitable.

If a thixotropic liquid is used as the lubricant, the undesired entry of the flowable medium into the core can additionally be prevented or reduced, respectively. Thixotropic liquids have a viscosity that is dependent on the shearing stress, whereby depositing of the flowable medium can be prevented. Thixotropic properties are to be found e.g. in potassium soaps or oils with certain admixtures. Besides the thixotropic properties, the lubricants or the liquid media, respectively, should be as inexpensive as possible and, ideally, also biologically degradable.

The changing of old cores for e.g., optical data transmission cables can be further facilitated and accelerated if at least one new cable or the like is pulled into the cable tube while the core is being pulled out.

The present invention will be explained by more detail by way of embodiments and figures illustrating the same. Therein.

FIG. 3a shows the other end of the cable according to detail III of FIG. 1 at the point of time of the method shown in FIG. 2a;

Figure 1:
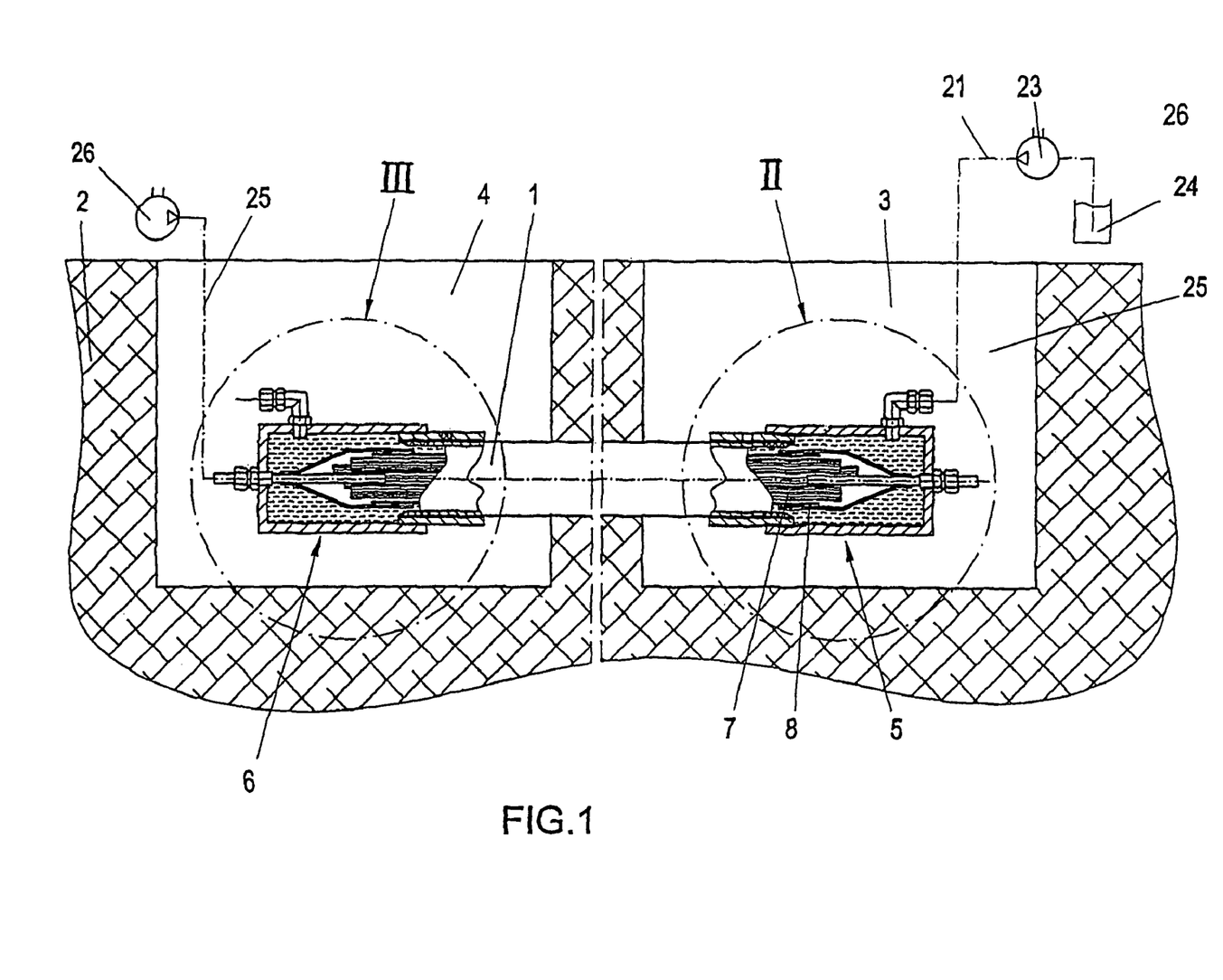
FIG. 1 shows the use of one embodiment of the method according to the invention at an underground cable, seen in side view.

FIG. 1 shows a cable 1 as has been used, or is still being used, respectively, e.g. in telecommunication, which usually is laid in the ground 2. To employ the method according to the invention, the cable 1 is exposed and severed at a certain location, the so-called starting pit 3. At a certain distance from the starting pit 3, e.g. 100 or 200 m, a so-called target pit 4 is made, and the cable 1 is also exposed and severed. Thus, there results a piece of cable 1 of a certain length with an end 5 located in the starting pit 3 as well as with an end 6 located in the target pit 4.

By way of FIGS. 2a to 2d, and 3a to 3c, respectively, which show details II and III, respectively, of FIG. 1 in enlarged illustrations during different method steps, an embodiment of the method according to the invention will be explained in more detail in the following. Usually the cable comprises a plurality of leads 7 made of massive copper or of copper strands and a leads insulation, e.g. made of paper or of a synthetic material. Moreover, groups of leads 7 may be surrounded by further insulations made of paper or synthetic material. Finally, the entirety of the leads 7 is surrounded by an envelope 8, preferably made of paper or synthetic material. The leads 7, the envelope 8 and optionally additional, further inwardly located envelopes, longitudinal fibers etc. together form the cable core. To protect the cable core from external mechanical and chemical influences, an inner sheath 9 is arranged which may consist of lead (Pb). Usually a further sheath layer 10, mostly of steel, in particular of a helically applied steel sheet, is arranged over the inner sheath 9, which sheath layer 10 additionally protects the cable 1 from mechanical influences. Externally on the steel layer 10, a further insulation 11, e.g. of oil-soaked fabric or synthetic material, may be provided which protects the steel sheath 10 from environmental influences. All together, the sheath layers 9 to 11 form the cable sheath. The cable core with its envelope 8 contacts the interior of the cable sheath substantially over its entire periphery, the cable sheath partially even encloses the cable core with a certain tension. By the "annular space" between cable core and cable sheath thus a space located between two interfaces (the outside of the cable core and the inside of the cable sheath) is to be understood, wherein the radial extension of the annular space may be as small as desired because of the direct contact of the interfaces. The end of the cable 1 in the starting pit 3 constitutes the so-called proximal cable end 5, the end of the cable 1 in the target pit 4, on the other hand, constitutes the so-called distal cable end 6. At the end of the method described in the following, a tensile force is applied to the cable core at the proximal cable end 5 in the starting pit 3 for extracting the cable core.

To start the method, the proximal cable end 5 from which the core is to be pulled out, is peeled by removing the cable sheath, i.e. the insulation 11, the steel sheath 10 as well as the lead (Pb) sheath 9, over a certain length, so that the cable core, i.e. the leads 7 and the envelope 8 project from the cable 1 for a certain length. As the following method step which is more clearly visible in FIG. 2a, an aerating and venting tube 12 is inserted into the cable core and there preferably is glued together with the latter. Subsequently, the end of the cable core plus its envelope 8 is enveloped by a core seal 13, e.g. a self-vulcanising rubber band, resulting in a preferably airtight and pressure-sealed closure of the cable core at the proximal cable end 5. A vulcanisation band has the advantage that the latter will automatically glue to the envelope 8 and to the aerating and venting tube 12, respectively, whereby a tight closure can be realised. Subsequently, a sleeve 14 made of metal, e.g., is pushed over the proximal cable end 5. The sleeve 14 may be provided with a bore 15 via which glue can be pressed in so that the annular space between the inner side of sleeve 14 and the outer side of the cable sheath is filled with the glue and a reliable connection of the sleeve 14 with the cable sheath is obtained. As glue, e.g. a two-component glue may be used which causes a rapid and reliable connection. The sleeve 14 serves to stabilize and secure the cable sheath to avoid damage by excessive axial forces when inserting the flowable medium under pressure, and during the later extraction of the cable core from the cable sheath, respectively.

Figure 3A:
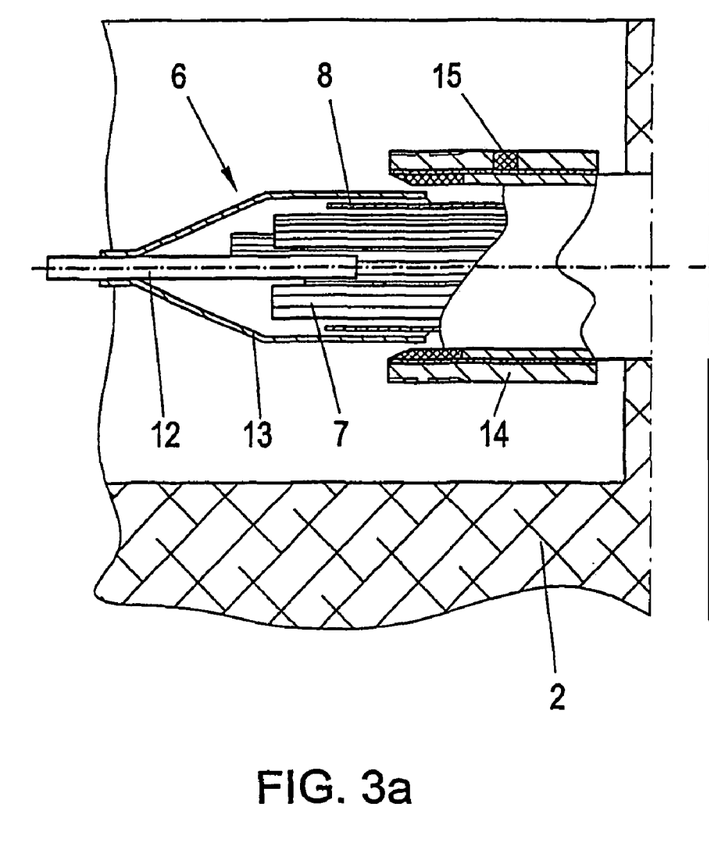

According to FIG. 3a, the distal cable end 6 in target pit 4 just as the proximal cable end 5 are cut off, peeled, provided with an aerating and venting tube 12 and, finally, the cable core is provided with a core sealing 13. Finally, also a sleeve 14 is laid around the cable sheath and glued together with the latter.

In other (not illustrated) embodiments, no aerating and venting tube is arranged at the proximal cable end 5. Yet also there the core sealing 13 closes the interior of the cable core pressure-sealed against the entry of flowable medium.

Figure 2A:
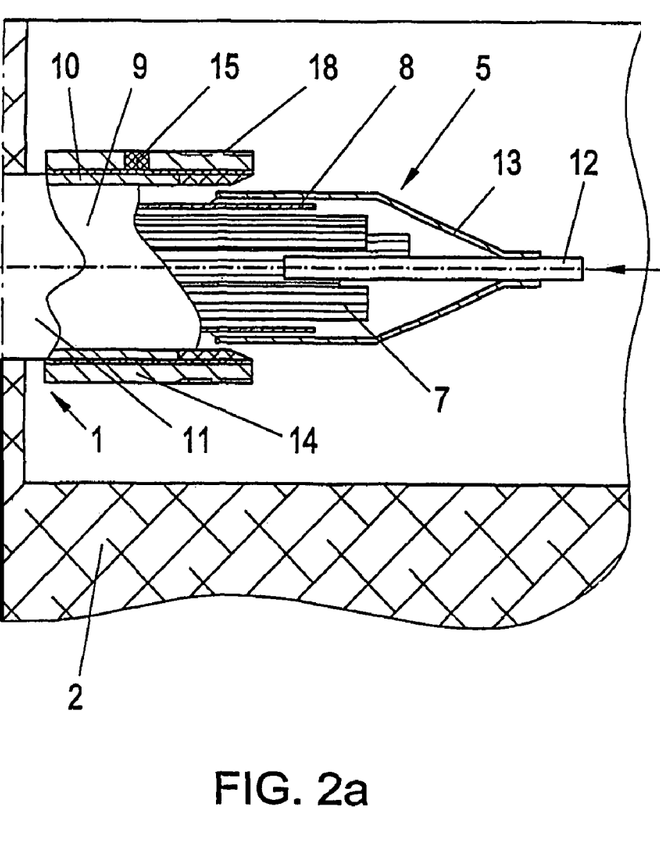
FIG. 2a shows the end of the cable according to detail II in FIG. 1 during a first method step.
Figure 2B:
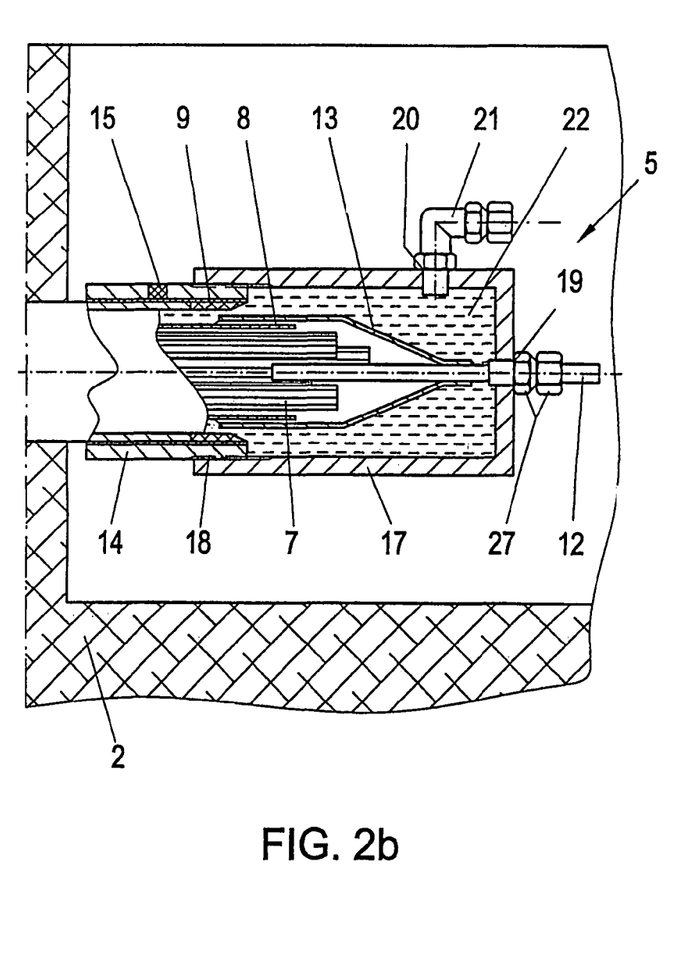
FIG. 2b shows the end of the cable during the introduction of the flowable medium.

According to FIG. 2b, finally, at the proximal cable end 5 of cable 1, a lid 17 is arranged over sleeve 14 and tightly connected with the former. This connection preferably is effected via a thread 18 at the outer side of sleeve 14 to which the lid 17 is screwed. If necessary, additional sealing material may be used. The lid 17 optionally has an opening 19 in the middle of its end side, through which the aerating and venting tube 12 can be put. On the sheath of the cylindrical part of lid 17, a further opening 20 is provided via which the feed line 21 for the flowable medium or lubricant 22, respectively, is connected. As is schematically visible in FIG. 1, the feed line 21 is connected to a pump 23 which in turn is connected to a container 24 for the lubricant 22. In case of an envelope 8 helically wound around the leads 7, the flowable medium or lubricant 22, respectively, is preferably introduced in counter-direction to the winding direction of envelope 8 (to define the winding direction: cf. FIG. 5), so that there is a tendency for the overlapping portions of the winding to be closed by the flow direction of the lubricant 22, whereby an entry of the flowable medium or lubricant 22 from the annular space into the cable core is reduced. In case of a wound envelope 8, the cable core, moreover, preferably is pulled out in the winding direction, because in this way the overlapping portions of the envelope 8 will not be opened like a fan during the extraction process and will not straddle against the extraction movement.

The flowable medium or lubricant 22, respectively, preferably has a lower density than the volume enclosed by the envelope 8. As has already been mentioned, gaseous, liquid or pasty media or mixed forms thereof are used as the flowable medium. The aerating and venting tube 12 is fixed with the lid 17 via appropriate union nuts 27, wherein a tensile force can be exerted on the aerating and venting tube 12 prior to fixing so that the core will be pre-stressed. Instead of being provided in lid 17, the opening 20 in theory can also be provided in sleeve 14 or in a corresponding extension of sleeve 14, and from there also the lubricant 22 can be introduced. However, sleeve 14 is designed as an expendable part, and therefore also the structural means preferably are arranged on lid 17 which can be used several times. When the cable core has been removed from cable 1, sleeve 14 may serve as connecting piece for re-connecting the cable pieces, if cable 1 again is being used as a tube for an optical waveguide, e.g., or the like.

Figure 3B:
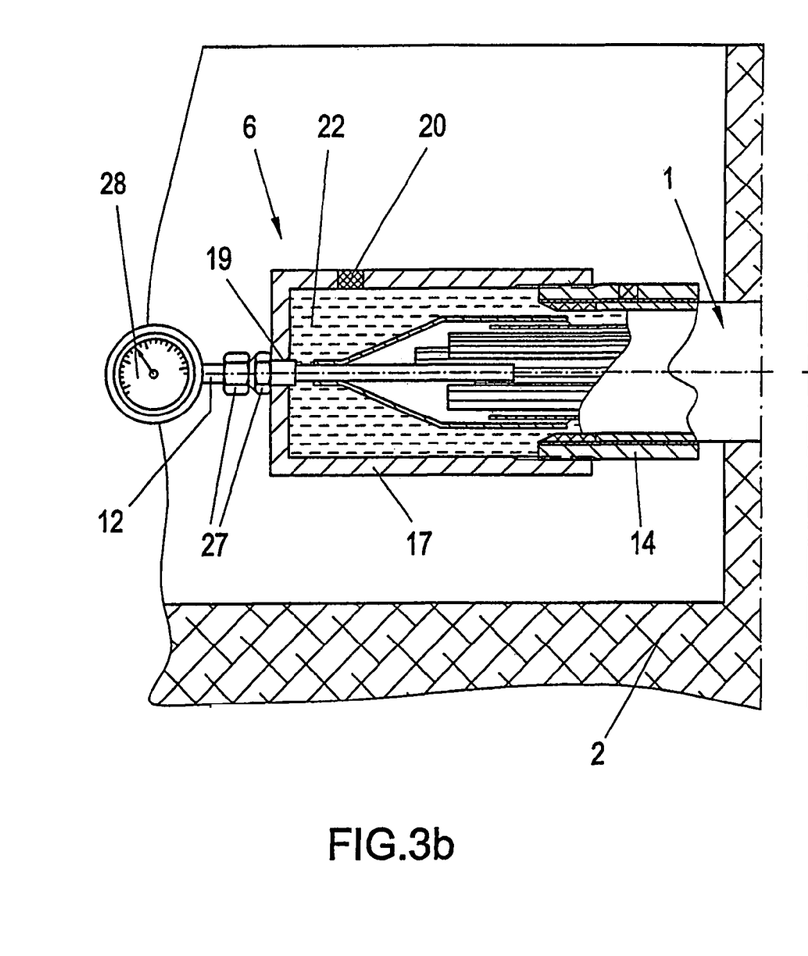
FIG. 3b shows the end of the cable according to detail III of FIG. 1 during the introduction of the flowable medium.
Figure 3C:
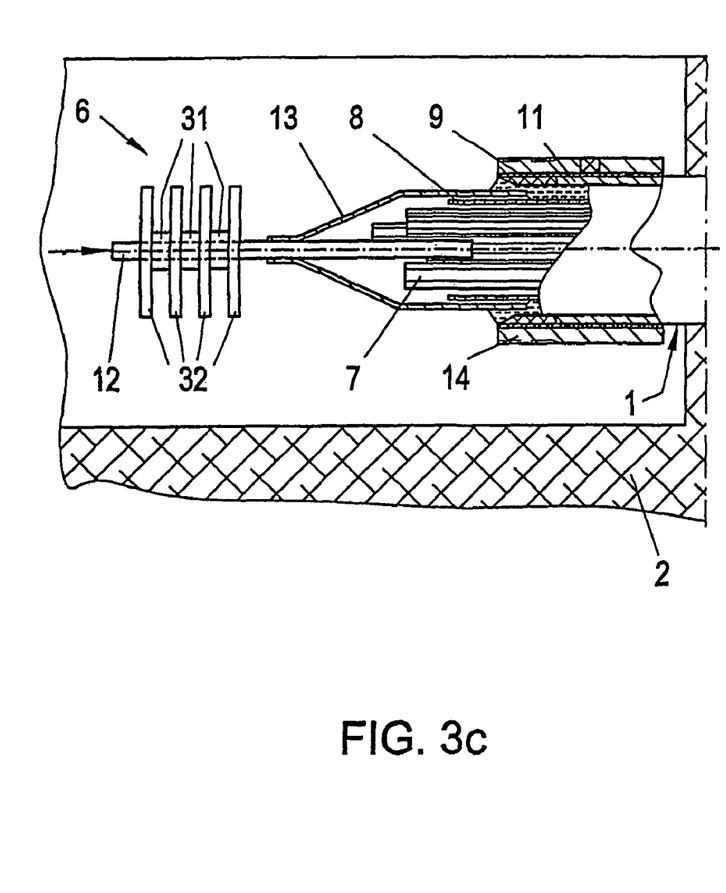
FIG. 3c shows the end of the cable according to detail III of FIG. 1 before the core is pulled out.

As can be seen from FIG. 3b for the distal cable end 6, also there a lid 17 is arranged over the cable end 6, and the aerating and venting tube 12 is fixed to the lid 17 by corresponding union nuts 24. Opening 20 on lid 17 and the aerating and venting tube 12 at first are kept clear. If compressed air is to be admitted to the interior of the cable core, the aerating and venting tube 12 may be connected via a duct 25 to a compressor 26 for producing the compressed air (FIG. 1).

Before carrying out the method proper, compressed air can be blown into the interior of the cable core via the aerating and venting tube 12, and the pressure can be monitored at the other end of the cable with the help of a manometer 28. By this measurement, the cable 1 is checked for it permeability. With the assistance of the pressure gauge usually provided on the compressed air compressor or on a compressed air connection 25, it can furthermore be checked whether or not cable 1 is tight, since a possible site of a break could be located by an insufficient pressure increase. When the cable has been checked for its tightness and permeability, finally, the end of the aerating and venting tube 12 will be closed (not illustrated) at the proximal cable end 5, e.g. by means of a rotatable closing means which is screwed onto the aerating and venting tube 12.

Now the method as such will start, i.e. the so-called flow step. For this purpose, via feed line 21 lubricant 22 is introduced under pressure via opening 20, the annular gap at the distal cable end 6 being open. The lubricant 22 enters the annular space between the lead (Pb) sheath 9 and the envelope 8 precisely targeted and there flows in the longitudinal direction of the cable to the distal cable end 6, without the risk of the lubricant 22 penetrating into the cable core. Compressed air may already be admitted to the interior of the cable core during the flow step. Preferably, in case of a wound around envelope 7, the compressed air will be introduced from the distal cable end 6, so that there will be a tendency of the flow of compressed air closing the overlapped portions of the winding, instead of opening them in fan-like manner. The pressure within the cable core presses the overlapped portions onto each other and thus makes it difficult for the lubricant 22 to penetrate into the interior of the cable core. By adding a liquid medium to the introduced compressed air, the overlapped portions of the envelope 8 can be caused to glue together. The liquid medium may be water, oil, or certain adhesives admixed to a particularly slight degree to the compressed air. Finally, the lubricant 22 makes its way through the annular space between the lead (Pb) sheath 9 and the envelope 8 as far as to the distal cable end 6. As soon as the lubricant 22 emerges from the opening 20 on lid 17 at the distal cable end 6, the annular space at the distal cable end 6 is sealed, this being done by closing the opening 20. Now the so-called compression step will start. The continued pressing in of the lubricant now does not mainly serve to transport the lubricant 22 through the annular space along cable 1 (naturally resulting already in a compression of the cable core), but it serves to build up pressure in the annular space, since the distal end of the annular space has now been closed. Whereas in the preceding flow step the lubricant 22 preferably only has moved along in longitudinal depressions of the envelope 8 (caused by the leads structure of the cable core) and therefore has not wetted the interface between envelope 8 and the inner side of the cable sheath over its entire periphery, there is now a (continuing) compression of the cable core (and possibly, an expansion of the cable sheath, if the latter is not completely rigid), whereby the lubricant 22 now will wet the said interface over its entire periphery. When a sufficient pressure has been built up, the press-in procedure of the lubricant will be stopped. The pressure application on lubricant 22 will be terminated when the pressure remains substantially stable and a further compression of the cable core is no longer possible. The lubricant 22 can be admixed to the flowable medium, or the flowable medium itself can be formed by the lubricant 22. The pressure applied to the lubricant 22 will depend on the structure of cable 1, the length of cable 1 as well as on various other factors. Finally, also flowable media are suitable, in which the lubricant is combined with a solvent that evaporates after some time. This facilitates the introduction of the liquid medium by dilution with the solvent, and finally, after evaporation of the solvent, there results an improved sliding action on account of the more viscous lubricant remaining.

Figure 2C:
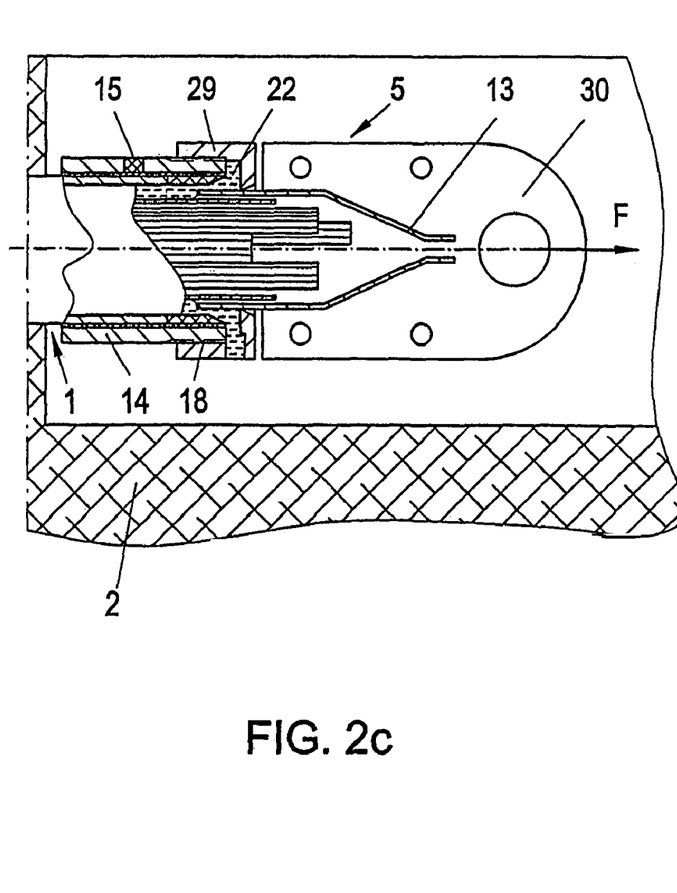
FIG. 2c shows the end of the cable according to detail II of FIG. 1 before the pulling out or extraction of the core is started.
Figure 2D:
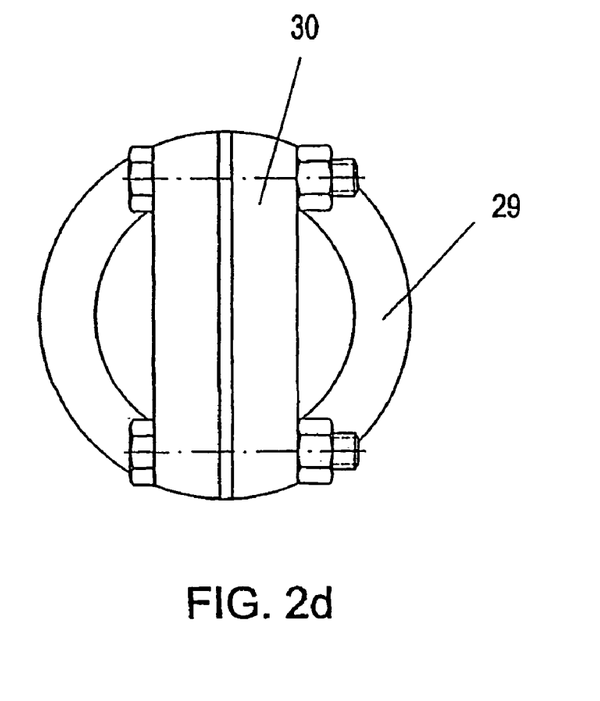
FIG. 2d shows a side view onto the end of the cable according to FIG. 2c.

Finally, according to FIG. 2c, the lid 17 is screwed off the proximal cable end 5, and the aerating and venting tube 12 is removed. Subsequently, a stripping means 29 for the lubricant 22 is fastened over the proximal cable end 5, which may be done e.g. by utilizing the thread 18 on sleeve 14. The stripping means 29 may be substantially annularly designed and have an elastic edge grazing on the envelope 8 so that the lubricant 22 is stripped off the envelope 8 when the cable core is pulled out and will flow downwards on account of gravity, where it can be collected by an appropriate funnel and an appropriate container (not illustrated) and re-used to a great extent. Finally, a clamp 30 is tightly connected over the core sealing 13, and a tensile force in the direction of arrow F is exerted on this clamp 30.

Figure 4:
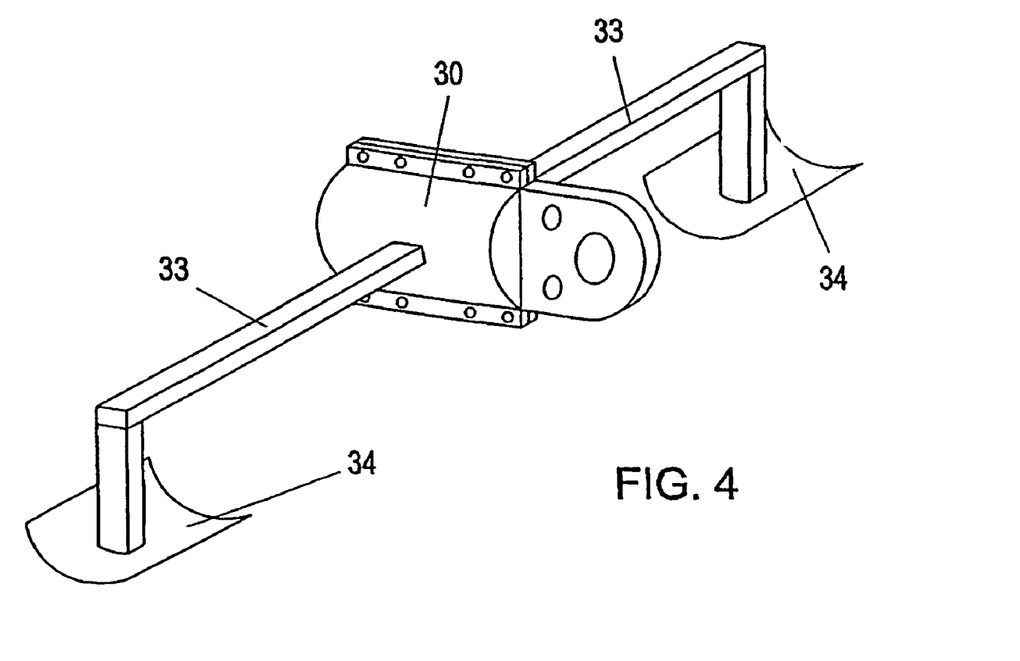
FIG. 4 shows a perspective view of a clip for pulling out the core with a means for protecting the core from being rotated.

At the distal end 6 of cable 1, the lid 17 is also removed. With the core sealing 13 at the distal cable end 6, one or more piston-like elements, e.g. discs 32 maintained in spaced relationship by spacer elements 31 can be arranged which entrain the lubricant 22 when the cable core is pulled out of cable 1 so that the lubricant emerges at the end 5 of cable 1 and is stripped off by the stripping means 29, where it can be collected and re-used. During the extraction of the cable core from the cable sheath, it is suitable to secure the cable core against rotation. This can be effected in various ways, e.g. by arms 33 or cantilevering means which are fastened to the clamp 30 and thus make a rotation impossible. In addition, sliding skids 34 can be fastened to the arms 33, which skids will slide on the ground while the core is being extracted (cf. FIG. 4). Furthermore, it is suitable also to secure cable 1 against rotation, which can be realized by arms or cantilevering means arranged on the sleeve 14 in a similar manner as illustrated in FIG. 4. Simultaneously with the extraction of the cable core, a new cable, e.g. a modern optical waveguide or the like, can be connected to the end of the cable core at the distal end 6 and thus can be pulled into the cable sheath that now forms a tube, simultaneously with the pulling-out procedure.

To avoid a damage to the envelope 8 at the proximal cable end 5, the cable core preferably is pulled out of the cable sheath straight over a certain length, before an intentional change of direction is made, e.g. so as to get the cable core from the starting pit 3 onto an appropriate reeling means (not illustrated).

Figure 5:
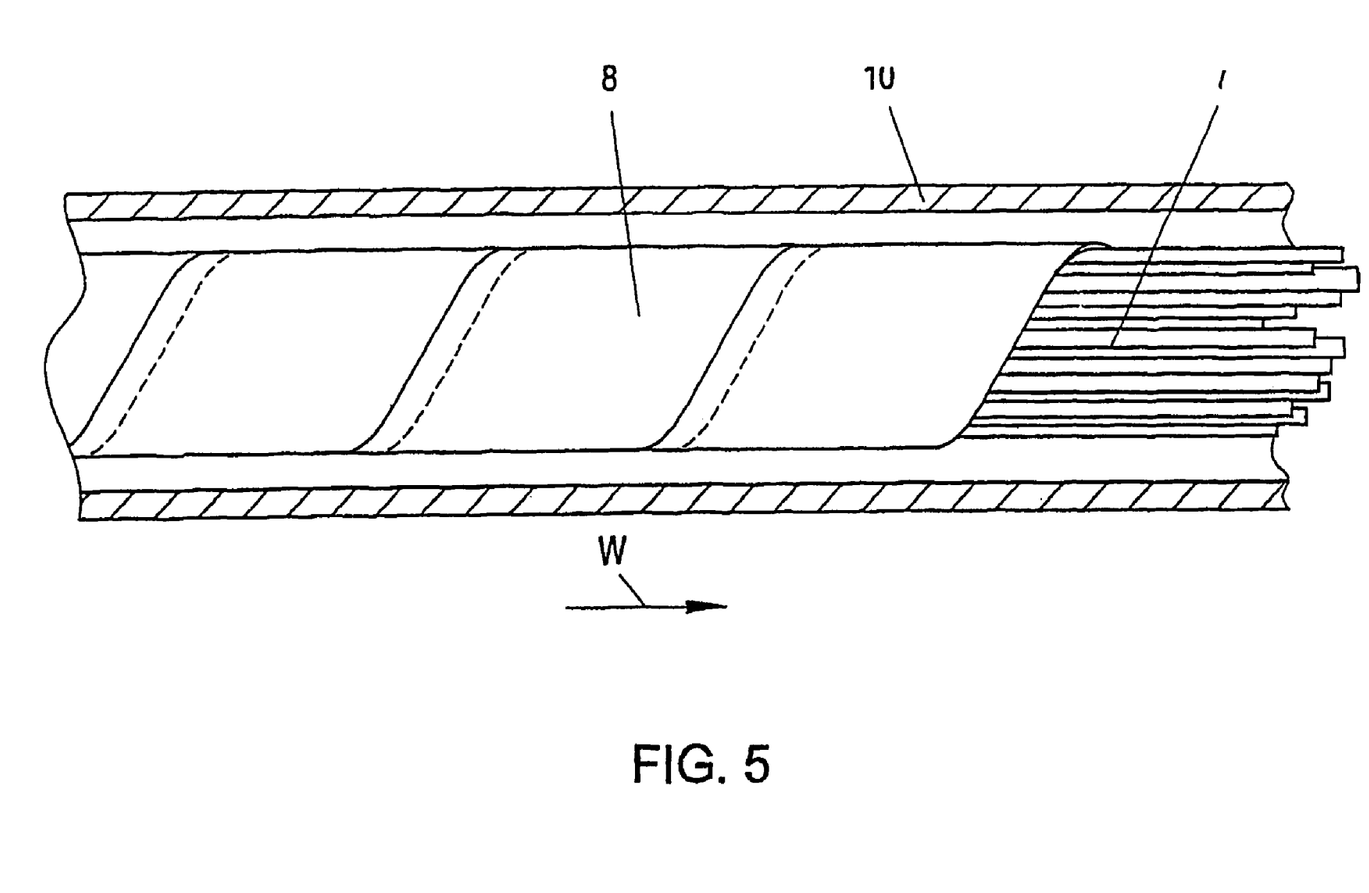
FIG. 5 shows a longitudinal section through a cable with a wound convoluted covering.

FIG. 5 illustrates the definition of the "winding direction" of the envelope 8 by way of a longitudinal section. When a strip is wound around the bundle of leads 7, there result scale-like overlaps in longitudinal section, wherein always the first laid winding is partially covered by the subsequent winding. The winding direction extends along the cable 1 and is that direction in which the winding proceeds while it is being made. In FIG. 5, the winding direction is indicated by arrow W. The preferred direction for introducing the lubricant is in counter-direction to the direction of arrow W so that the overlapping portions of the strip-type envelope 8 will be closed by the flow of the lubricant. The preferred direction for introducing the compressed air into the interior of the cable core surrounded by the envelope 8 is in the winding direction, in the direction of arrow W, since by this the overlaps of the strip-shaped envelope 8 will be rather closed than opened. Finally, the preferred direction for pulling out the cable core again is in the direction of the arrow W of the winding, since by this the overlapping portions of the strip-shaped envelope 8 will be closed during the extraction movement.

The Figures only show an exemplary embodiment of the invention. Structural changes and differences in the method course are possible within the scope of the claims.

The invention claimed is:

1. A method for removing a cable core from a cable sheath, comprising the steps of:
    identifying a pre-existing, previously operating transmission cable located in an original cable location, the transmission cable comprising a cable core assembled tightly within a cable sheath, the cable core comprising at least one conductive lead substantially along the length of the cable core, the cable core also comprising an envelope having an outer surface, the envelope formed around the length, but not the ends of the at least one lead and the cable sheath having an inner surface facing the outer surface of the envelope, with the outer surface of the envelope and the inner surface of the cable sheath defining the boundary of an interface region between the cable sheath and the envelope;
    isolating a proximal end and a distal end of the cable, with the interior within the cable sheath exposed at the proximal and distal ends;
    sealing the proximal end of the cable core;
    selectively directing a flowable medium into the proximal end of the interface region and not directing the flowable medium into the proximal end of the cable core;
    causing the flowable medium to increase the volume of the interface region by increasing the distance in the radial direction between the cable sheath and the envelope and reduce the friction between the envelope and the sheath;
    exerting a force in the longitudinal direction on the cable core; and
    moving the cable core, including the envelope and the at least one conductive lead, in the longitudinal direction with respect to the sheath, to remove the core from the sheath, while leaving the sheath behind in the original cable location.

2. A method according to claim 1, wherein at least during part of the step of introducing the flowable medium, a flow step is performed wherein the interface is not pressure-sealed at the distal end and the flowable medium flows from the proximal end of the interface to the distal end of the interface.

3. A method according to claim 1 wherein at least during part of the step of introducing the flowable medium, a compression step is performed, wherein the flowable medium acts under pressure to compress the envelope and increase the volume of the interface.

4. A method according to claim 1 wherein the flow step is carried out, then the core is pressure sealed at the distal end and subsequently a compression step is carried out in which the flowable medium acts under pressure to increase the volume of the interface.

5. A method according to claim 4, wherein after the flowable medium flows to the distal end of the interface, the flow step is terminated and the compression step is started.

6. A method according to claim 1, wherein the envelope comprises wrapping material, wrapped in an overlapping helix from the distal end towards the proximal end and the flowable medium is introduced from the proximal end towards the distal end.

7. A method according to claim 1, wherein the envelope comprises wrapping material, wrapped in an overlapping helix from the distal end to the proximal end and the cable core is pulled in a direction from the distal end towards the proximal end.

8. A method according to claim 1, wherein a compressed gas is introduced into the interface and increases the volume of the interface.

9. A method according to claim 8, wherein the compressed gas is air.

10. A method according to claim 6, wherein the flowable medium is directed into the interface so as not to travel through the overlapped wrapping material into the cable core.

11. A method according to claim 1, wherein the interior of the cable core at the proximal cable end is closed and pressure-sealed relative to the flowable medium with a cap, so that the fluid cannot penetrate into the interior of the cable core at the proximal cable end.

12. A method according to claim 1, wherein the interior of the cable core at the distal cable end is closed and pressure-sealed relative to the interface so that at the distal cable end the flowable medium emerging from the interface cannot enter into the interior of the cable core.

13. A method according to claim 11, wherein the cap comprises a rubber band.

14. A method according to claim 13, wherein the cap is equipped with a venting tube for venting the interior of the cable core.

15. A method according to claim 1, wherein the flowable medium is introduced into the interface and is used to expand the size of the interface before the core is pulled out.

16. A method according to claim 1, wherein the flowable medium is introduced into the interface while the cable core is being pulled out.

17. A method according to claim 1, wherein the interior of the cable core at both ends of the cable is closed in a pressure-sealed manner relative to the interface region before the flowable medium is introduced.

18. A method according to claim 1, wherein the tightness of the cable is checked with compressed air before the flowable medium is introduced.

19. A method according to claim 1, wherein the permeability of the cable is checked with compressed air before the flowable medium is introduced.

20. A method according to claim 1, wherein the cable core is tensioned while the flowable medium is being introduced.

21. A method according to claim 1, wherein the cable core is secured against rotation during the extraction procedure.

22. A method according to claim 1, wherein the lead comprises wires within the cable core in a helical configuration having a helical direction and during the extraction procedure, the cable core is rotated in the helical direction of the wires present in the cable core.

23. A method according to claim 1, wherein at that end of the cable at which the cable core is being pulled out, the flowable medium is stripped off during the pull-out procedure and collected.

24. A method according to claim 1, wherein at the other end of the cable than the end at which the cable core is being pulled out, the flowable medium is entrained by the cable core during the extraction procedure by a piston-like element connected to one end of the cable core.

25. A method according to claim 1, wherein during the extraction procedure, the cable sheath is secured against rotation at the end at which the cable core is pulled out.

26. A method according to claim 1, wherein during the core removal procedure, to assist the extraction of the cable core, a pressure force is exerted on the end of the cable core away from the distal end.

27. A method according to claim 26, wherein the pressure force is applied via a flowable pressing-out medium introduced under pressure to the end of the cable core away from the distal end.

28. A method according to claim 1, wherein the removal force is transmitted to the cable core via a clamp which is fastened to the cable core.

29. A method according to claim 1, wherein the removal force is applied to the cable core via a motor-driven shaft about which the cable core is wound several times.

30. A method according to claim 1, wherein at least one new optical transmission cable is pulled into the cable sheath after the extraction of the core.

31. A method according to claim 1, wherein the flowable medium is not directed to flow into the envelope.

32. A method according to claim 11, wherein the flowable medium is directed into the interface under pressure to compress the cable core.

33. A method according to claim 1, wherein the flowable medium is directed into the interface under pressure to expand the cable sheath.

34. A method according to claim 1, wherein the flowable medium is pressurized to expand the cable sheath and compress the cable core.

* * * * *